Dec. 4, 1962 J. G. RAY 3,067,356
FLUORESCENT LAMP
Filed April 6, 1960

JOHN G. RAY
INVENTOR.

BY
ATTORNEY

United States Patent Office 3,067,356
Patented Dec. 4, 1962

3,067,356
FLUORESCENT LAMP
John G. Ray, Topsfield, Mass., assignor to Sylvania Electric Products Inc., a corporation of Delaware
Filed Apr. 6, 1960, Ser. No. 20,487
6 Claims. (Cl. 313—221)

This invention relates to refractory oxide coatings for use in the treatment of the interior surface of glass envelopes of fluorescent lamps. More specifically, this invention relates to a glass coating composition which is to be utilized in an aperture lamp; that is, in a lamp having a phosphor coating over part only of its interior surface in order to provide an aperture through which the light from the inside surface of the phosphor coating may emerge.

It has been determined that when a lamp is made of clear glass, with no phosphor, it will tend to discolor upon burning. This discoloration which occurs on the inner surface of the glass envelope is the result of a mercury-alkali amalgam formation.

It has further been determined that the rate and density of the discoloration of the glass is proportional to the amount of alkali, specifically sodium, which is available at the glass surface to react with mercury.

Fluorescent lamps, as presently made, have electrodes, mercury vapor, a phosphor coating and use a soda-lime glass envelope material; that is, one having a sodium oxide ($Na_2O$) content higher than approximately 15%. During the lamp processing, the glass envelope is baked at a temperature of 550° C. to 600° C. to remove the binder from the phosphor. In addition, during evacuation, the envelope is reheated to approximately 300° C. to facilitate the removal of the molecules of gas adsorbed on the glass and phosphor surface.

Each of these bakeouts is quite necessary; however, each tends to diffuse alkali from the glass of the envelope to the surface. During lamp operation, mercury ions strike this alkali covering and a black-brown deposit of a mercury-alkali amalgam is formed. It is apparent that any dark discoloration will reduce the light transmission since the absorbed light will be converted to heat.

In an aperture lamp this problem of discoloration is accentuated to a higher degree. The aperture lamp is a very high output type of fluorescent lamp which is designed with a phosphor coating extending part way around the lamp and in such a manner as to leave a slot of clear glass throughout the length of the lamp. The purpose of this construction is to concentrate a beam of light through the clear glass section.

While the refractory oxides for surface treatment of the glass envelope of this invention find particular use in the aperture lamp, it is apparent that they may be used in conventional fluorescent lamps with similar superior results, especially when the lamp is used at high outputs and where glass darkening imposes a problem.

It is an object of this invention to provide a refractory oxide layer on the inner surface of the glass envelope which inhibits the mercury-alkali reaction.

It is a further object of this invention to provide a glass envelope with an inner surface of refractory oxide of a member selected from the group consisting of $Al_2O_3$, $SiO_2$ and $TiO_2$ in transparent thickness.

Other features, objects and advantages will become apparent from the following description, taken in connection with the accompanying drawings.

Figure 1:
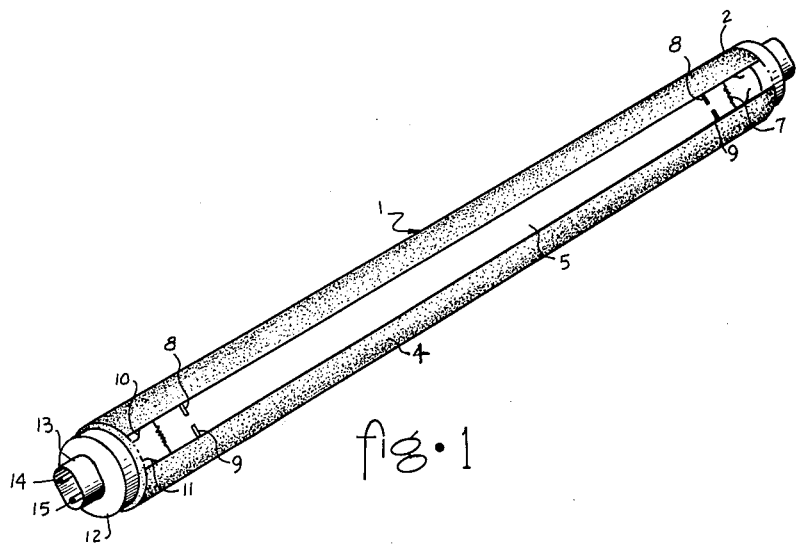
FIGURE 1 shows one embodiment of a lamp according to this invention.
Figure 2:
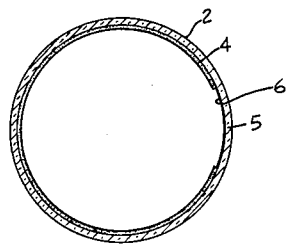
FIGURE 2 shows a cross-section through the middle of the lamp.

In FIGURE 1, the lamp 1 has a sealed, hollow, glass tube 2 containing a filling of 85% argon and 15% helium (although other suitable gas fillings may be used). On the inside surface of the glass envelope there is a coating 4 of the phosphor. This phosphor may be, for example, calcium halophosphate activated with antimony and manganese or any other suitable fluorescent lamp phosphor. This coating is shown in section in FIGURE 2. The phosphor coating 4 is shown to extend around about 315° of the circumference of the tube, the other 45°, aperture 5, of the tube being left free of phosphor coating to allow the light to emerge therethrough. At least on the clear portion 5 there is deposited the thin layer 6 of the refractory oxide. It is important to note that this aperture 5 should only be coated to such an extent that the direct passage of light therethrough is not substantially affected and the tube remains transparent but still prevents the mercury-alkali amalgam formation. It has been determined that coatings having a thickness of about .0005 inch to about .001 inch perform this function. Above this range, th eglass tends to become more translucent and below the mercury-alkali reaction will not be substantially inhibited.

The aperture utilized in the tube is to be determined by the amount of light desired. Thus, sizes other than the 45° above noted may be utilized such as between 20° and 90°. The brightness in the aperture area increases as the aperture width is reduced.

At each end of the glass tube 1 there is an electrode comprising an oxide-coated tungsten coil 7, two auxiliary anodes 8, 9, and the support and lead-in wires 10, 11, as shown, for example, in a United States patent application Serial No. 742,928, filed June 18, 1958, by John F. Waymouth et al., for a Fluorescent Lamp now Patent Number 2,961,566. The usual insulating plastic base 12, with the boss 13 carrying contacts 14, 15, can be as shown, for example, in United States Patent No. 2,896,187, issued July 21, 1959, to R. B. Thomas and S. C. Shappell, for a Lamp Base, or some other suitable base can be used.

The coating may be applied at first over the entire glass envelope by methods well known in the art, and then the phosphor scraped or brushed off from the aperture 5 of the glass tube 2, as desired.

This invention finds particular application when the glass envelope 2 has the usual soda-alkali composition, that is, one having a soda content higher than 15%. This composition, expressed as an oxide composition, is generally as noted in Table I.

TABLE I

| | Percent |
|---|---|
| $SiO_2$ | 73.6 |
| $Na_2O$ | 16.0 |
| $K_2O$ | .6 |
| $Al_2O_3$ | 1.0 |
| $CaO$ | 5.2 |
| $MgO$ | 3.6 |

Of course, as is apparent, the invention will find use as a coating in many other types of glass, such as one which tends to darken upon burning due to the mercury-alkali compound formation.

It has been determined that by using an alkali-free refractory oxide layer of $Al_2O_3$, $TiO_2$, $SiO_2$ or appropriate mixtures thereof, the resulting barrier layer appreciably reduces the darkening. This barrier layer may be coated only in the aperture itself or for convenience it may be coated over the entire glass surface and the phosphor deposited over the barrier layer.

The refractory oxide coating is prepared by milling in a lacquer vehicle. Suitable proportions have been 20 grams of finely divided (less than 200 mesh) $Al_2O_3$, $SiO_2$, or $TiO_2$ to 1750 cc. of vehicle shown in Table II. It is apparent, however, that the proportions of refractory oxide to vehicle should be varied to yield the desired viscosity. Good results have been obtained with refractory oxides having average particle sizes ranging as low as .010 micron.

TABLE II

*Lacquer Vehicle Percent by Weight*

| | Percent |
|---|---|
| Xylol | 84 |
| Butanol | 11 |
| Dibutal phthacate | 2.5 |
| Ethyl cellulose | 2.5 |

After the inside surface is coated and dried, the glass envelopes are baked at a temperature just below the deformation of the glass. In the case of soda-lime glass, this would be in the range of 550° C. to 600° C. At these temperatures the glass of the envelope is sufficiently hot to cause the refractory oxide coatings to become affixed to it. A barrier layer of the refractory oxide is formed which prevents reaction of the mercury with the alkali constituents; that is, the $Na_2O$ and $K_2O$ in the glass.

It is apparent that variations of these treatments are possible. For example, the various refractory oxides may be mixed rather than using a single one or a composition which forms a glass composition may be mixed with the oxide. Such glass compositions are disclosed in my co-pending application entitled Electron Discharge Lamp, Serial No. 20,477 filed April 6, 1960.

When using soda-lime glass such as described in Table I in the aperture lamp with no prior surface treatment, the clear glass portion becomes excessively darkened within 100 hours. However, when the soda-lime glass has been treated with a refractory oxide such as described above, there is a marked reduction in the degree of darkening during life. This difference is pointed out in Table III following.

TABLE III

| Glass | Percent Maintenance From 0 Hours | |
|---|---|---|
| | 100 Hours | 500 Hours |
| Untreated soda-lime | 78 | 60 |
| Soda-lime with $Al_2O_3$ coating | 92 | 81 |
| Soda-lime with $SiO_2$ coating | 92 | 75 |
| Soda-lime with $TiO_2$ coating | 90 | 88 |

It is apparent that other variations and modifications may be made by those skilled in the art; it is my intent, however, to be limited only by the scope of the appended claims.

What I claim is:

1. An electron discharge lamp comprising: a glass envelope, mercury vapor and means through which an electric discharge is produced within said envelope, a transparent barrier layer of substantially alkali-free $Al_2O_3$ disposed directly upon and adhering to the inner surface of said envelope to inhibit the formation of a mercury-alkali amalgam on said envelope.

2. A glass envelope for use in electron discharge lamp, said envelope having a transparent barrier layer of substantially alkali-free $Al_2O_3$ for inhibiting a mercury alkali amalgam formation disposed directly upon and adhering to the inner surface thereof.

3. A fluorescent lamp comprising: a glass envelope containing electrodes and mercury vapor, a transparent barrier layer of substantially alkali-free $Al_2O_3$ for inhibiting a mercury-alkali amalgam formation adhering to and disposed directly upon the inner surface of said envelope and a phosphor coating exposed to said mercury vapor extending part way around the inner surface of said envelope.

4. A fluorescent lamp comprising a glass envelope, mercury vapor and means through which an electron discharge is produced within said envelope, a transparent barrier layer of $Al_2O_3$ disposed directly upon and adhering to the inner surface of said envelope to inhibit the formation of a mercury-alkali amalgam formation and a phosphor coating exposed to said mercury vapor on said layer.

5. An electric discharge lamp comprising: a glass envelope containing amalgam forming materials, mercury vapor and means through which an electric discharge is produced in said envelope, a transparent barrier layer of substantially alkali free $Al_2O_3$ disposed directly upon and adhering to the inner surface of said envelope to inhibit the formation of a mercury-alkali amalgam on said envelope.

6. An electric discharge lamp comprising: a glass envelope, mercury vapor and means through which an electric discharge is produced in said envelope, a transparent barrier layer of substantially alkali-free $Al_2O_3$ disposed directly upon and adhering to the inner surface of said envelope to inhibit the formation of a mercury-alkali amalgam on said envelope, said barrier layer being 0.0005 to 0.001 inch thick.

References Cited in the file of this patent

UNITED STATES PATENTS

| | | |
|---|---|---|
| 2,151,496 | Beese | Mar. 21, 1939 |
| 2,177,691 | Dawihl | Oct. 31, 1939 |
| 2,386,277 | Smith | Oct. 9, 1945 |
| 2,407,379 | Morehouse | Sept. 10, 1946 |
| 2,854,600 | Weijer | Sept. 30, 1958 |